(12) United States Patent
Chang et al.

(10) Patent No.: US 8,274,002 B2
(45) Date of Patent: Sep. 25, 2012

(54) MODULAR KEYBOARD AND MANUFACTURING METHOD THEREOF

(75) Inventors: Ching-Hui Chang, Banqiao (TW);
Ching-Feng Hsieh, Taipei (TW);
Ko-Hsien Lee, Dayuan Township (TW)

(73) Assignee: Askey Computer Corp. (TW)

( * ) Notice: Subject to any disclaimer, the term of this patent is extended or adjusted under 35 U.S.C. 154(b) by 429 days.

(21) Appl. No.: 12/579,522

(22) Filed: Oct. 15, 2009

(65) Prior Publication Data

US 2010/0258417 A1 Oct. 14, 2010

(30) Foreign Application Priority Data

Apr. 10, 2009 (TW) ................................ 98112010 A

(51) Int. Cl.
*H01H 13/70* (2006.01)
(52) U.S. Cl. .................. 200/5 A; 200/302.1; 29/622
(58) Field of Classification Search .................. 200/5 A, 200/512, 517, 302.1, 302.2, 341; 341/22; 345/168, 169; 400/490–496; 29/622
See application file for complete search history.

(56) References Cited

U.S. PATENT DOCUMENTS

| | | | | |
|---|---|---|---|---|
| 4,324,956 A | * | 4/1982 | Sakakino et al. | 200/16 R |
| 4,338,502 A | * | 7/1982 | Hashimoto et al. | 200/512 |
| 4,634,818 A | * | 1/1987 | Hayes-Pankhurst et al. | 200/5 A |
| 4,640,994 A | * | 2/1987 | Komaki | 200/5 A |
| 4,703,160 A | * | 10/1987 | Narishima et al. | 235/1 D |
| 4,801,768 A | * | 1/1989 | Sugiyama et al. | 200/5 A |
| 5,734,137 A | * | 3/1998 | Wakefield | 200/5 A |
| 5,773,775 A | * | 6/1998 | Azema | 200/61.08 |
| 5,865,301 A | * | 2/1999 | Kawabe et al. | 200/313 |
| 5,962,827 A | * | 10/1999 | Zdanys, Jr. | 200/302.1 |
| 6,215,420 B1 | * | 4/2001 | Harrison et al. | 341/22 |
| 6,355,890 B1 | * | 3/2002 | Kuroda | 200/5 A |
| 2007/0051603 A1 | | 3/2007 | Hakunti et al. | |

FOREIGN PATENT DOCUMENTS

| | | |
|---|---|---|
| DE | 3716379 A1 | 11/1987 |
| DE | 29803399 U1 | 6/1998 |
| DE | 10225920 A1 | 11/2003 |

OTHER PUBLICATIONS

Concise Explanation of Relevance for non-English Language Information, Translation of Office Action/Search Report from DPMA, 1 page.
Bednarz, Jurgen, Kunststoffe in der Elektrotechnik und Elektronik, 1988, 13 pages, W. Kohlhammer Druckerel GmbH & Co. Stuttgart, Germany, p. 384-393.

* cited by examiner

*Primary Examiner* — Michael Friedhofer
(74) *Attorney, Agent, or Firm* — Schmeiser, Olsen & Watts, LLP

(57) ABSTRACT

A modular keyboard includes an upper casing, a lower casing corresponding to the upper casing, an electric conduction element and a circuit board. The upper casing includes a first side and a second side opposite to each other, and a plurality of press keys disposed on the first side. The lower casing is set for sealing the second side, and an enclosure space is formed between the upper casing and the lower casing. The electric conduction element is installed on the second side in the enclosure space, and the circuit board is installed between the electric conduction element and the lower casing. With a supersonic welding technique, the upper casing and the lower casing are engaged with each other to seal the enclosure space and isolate the electric conduction element in the enclosure space and the circuit board from the exterior.

10 Claims, 3 Drawing Sheets

MODULAR KEYBOARD AND MANUFACTURING METHOD THEREOF

CROSS-REFERENCE TO RELATED APPLICATIONS

This non-provisional application claims priority under 35 U.S.C. §119(a) on Patent Application No(s). 098112010 filed in Taiwan, R.O.C. on 10 Apr. 2009, the entire contents of which are hereby incorporated by reference.

FIELD OF THE INVENTION

The present invention relates to a press key modularization technology, in particular to a modular keyboard and a manufacturing method of the modular keyboard.

BACKGROUND OF THE INVENTION

Electronic products such as personal computers, notebook computers, electronic dictionaries, calculators, mobile phones, personal digital assistants (PDA) require an input device for facilitating an input or an operation of the electronic products.

For example, a computer keyboard generally includes an upper casing having a plurality of key seats, a plurality of elastic elements disposed in the plurality of key seats respectively, a plurality of key caps for supporting vertically up and down movements of the plurality of elastic elements, a circuit membrane electrically connected to the plurality of key caps, a circuit board electrically connected to the circuit membrane, and a base for retaining the circuit board. Users can press any key cap, such that the key cap is electrically connected to an electric contact of the circuit membrane, and then an input/output terminal (I/O) of the circuit membrane is electrically connected to the circuit board for transmitting a key code representing the corresponding key cap to a computer system, such that users can observe the results on a display device.

However, the aforementioned prior art installs the key cap and the circuit membrane independently, and a gap is generally formed between the key cap and the circuit membrane, and thus liquid such as water, tea or coffee may permeate directly into the keyboard through the gap and affect the electric properties of the keyboard or cause errors or failures, so that the reliability of the keyboard is reduced. Thus, some manufacturers provide a waterproof function of the keyboard, and related patented technologies were disclosed in R.O.C. Pat. Publication Nos. 200809891 and 200826130, R.O.C. Pat. Nos. M334390, M312718, M281227, M243721, and R.O.C. Pat. Publication No. 553433, etc.

For example, some manufacturers produce a keyboard comprising a main body, a press key body, a conductive membrane and a circuit board, and rubber strips or adhesives are used for assembling the main body and the press key body to provide the waterproof effect. This design mainly uses an insulating layer to cover pins and power line terminals of electronic components on the circuit board, and rubber strips and metal strips are used for sealing the terminals of the conductive membrane connected to the circuit board.

However, the aforementioned prior art can achieve the water-repellent effect only. If the keyboard is dipped into a liquid such as water, then the water still will enter into the keyboard. Furthermore, the prior art requires the aforementioned manufacturing processes and thus incurs a long manufacturing time, and results in rubber cracking, adhesive peeling, and failure of providing the waterproof function.

SUMMARY OF THE INVENTION

Therefore, it is a primary objective of the present invention to overcome the aforementioned shortcomings of the prior art by providing a waterproof modular keyboard and a manufacturing method of the waterproof modular keyboard.

Another objective of the present invention is to provide a modular keyboard and a manufacturing method of the modular keyboard for reducing the assembling and manufacturing time.

A further objective of the present invention is to provide a modular keyboard and a manufacturing method of the modular keyboard for enhancing the structural strength of the modular keyboard.

To achieve the foregoing and other objectives, the present invention provides a modular keyboard, comprising: an upper casing, having a first side and a second side disposed opposite to each other, and the first side having a plurality of press keys; a lower casing, for sealing the second side; an enclosure space, formed between the lower casing and the upper casing; an electric conduction element, installed on the second side, and disposed in the enclosure space; and a circuit board, installed between the electric conduction element and the lower casing, and disposed in the enclosure space. The present invention further provides a manufacturing method of the modular keyboard, and the manufacturing method comprises the steps of: providing an upper casing, wherein the upper casing has a first side and a second side corresponding to each other, and the first side has a plurality of press keys; providing a lower casing, wherein the lower casing is provided for sealing the second side, and an enclosure space is formed between the lower casing and the upper casing; providing an electric conduction element, wherein the electric conduction element is installed on the second side, and disposed in the enclosure space; providing a circuit board, wherein the circuit board is installed between the electric conduction element and the lower casing and disposed in the enclosure space; and combining the upper casing and the lower casing by a supersonic welding technology for sealing the enclosure space.

In the aforementioned modular keyboard and its manufacturing method, the upper casing and the lower casing are plastic casings. The electric conduction element is a circular metal plate sticker, a carbon particle, or any other equivalent electro-conductive component. The enclosure space has a height greater than or equal to the sum of the thickness of the electric conduction element and the thickness of the circuit board. In an embodiment, the upper casing includes a groove, wherein the groove has a depth greater than or equal to the sum of the thickness of the electric conduction element and the thickness of the circuit board. In another embodiment, both upper casing and lower casing have corresponding grooves respectively, wherein the two grooves have a total depth greater than or equal to the sum of the thickness of the electric conduction element and the thickness of the circuit board.

Compared with the prior art, the design of the present invention encloses the circuit board and the electric conduction element and then combines the upper and lower casing to form an integral module to achieve a fully waterproof effect of the keyboard and overcome the existing issue of the prior art having a water-repellent effect only. Unlike the prior art that requires different assembling processes and a long manufacturing time, the present invention simply adopts the supersonic welding technology to complete the assembling process. In addition, the present invention can overcome the rubber cracking and adhesive peeling issues of the prior art to assure the waterproof function. Since the upper casing and the lower casing are welded integrally, the invention not only provides the waterproof effect, but also enhances the structural strength of the keyboard.

BRIEF DESCRIPTION OF THE DRAWINGS

FIG. 1b is a top view of FIG. 1a;

DESCRIPTION OF THE PREFERRED EMBODIMENTS

Other features and advantages of the present invention will become apparent in the following detailed description of the preferred embodiments with reference to the accompanying drawings.

Figure 1A:
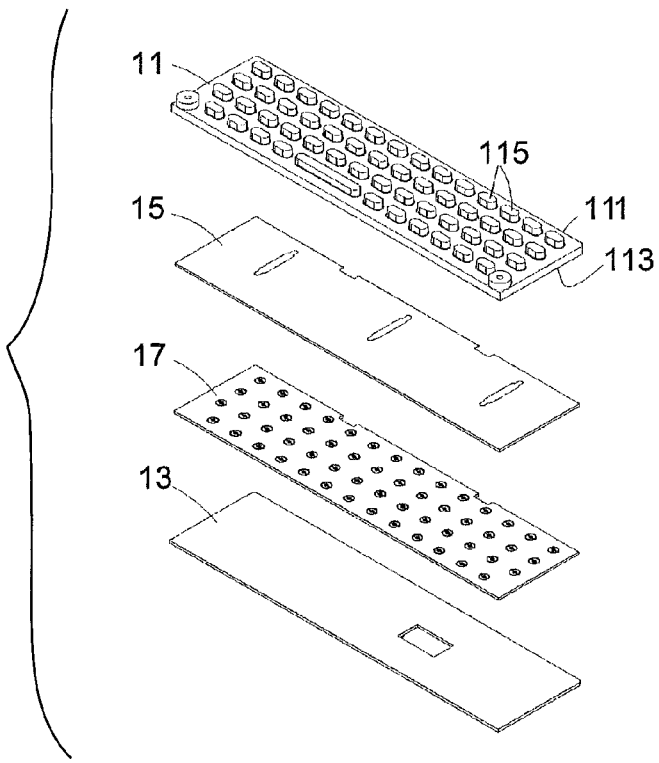
FIG. 1a is an exploded view of a modular keyboard in accordance with a first preferred embodiment of the present invention.

With reference to FIG. 1a to 3b for the drawings of a modular keyboard and its manufacturing method in accordance with a first preferred embodiment of the present invention, the modular keyboard 1 as shown in FIG. 1a comprises an upper casing 11, a lower casing 13 corresponding to the upper casing 11, an electric conduction element 15 installed on a side of the upper casing 11 and disposed between the upper casing 11 and the lower casing 13, and a circuit board 17 installed on a side of the electric conduction element 15 and disposed between the electric conduction element 15 and the lower casing 13.

Figure 1B:
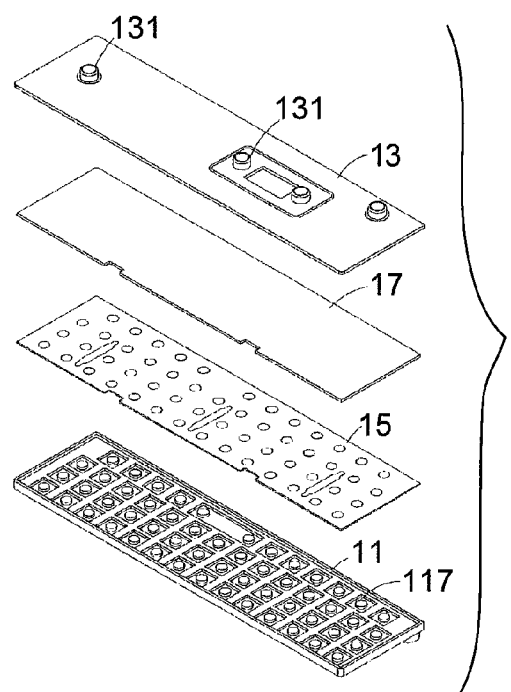

In FIG. 1a, the upper casing 11 includes a first side 111 and a second side 113 disposed opposite to each other, and the first side 111 includes a plurality of press keys 115, and the lower casing 13 is provided for sealing the second side 113. In this preferred embodiment, the upper casing 11 and the lower casing 13 are plastic upper casings as shown in FIG. 1b, and the upper casing 11 includes a groove 117 having a depth substantially equal to the sum of the thickness of the electric conduction element 15 and the thickness of the circuit board to facilitate forming an enclosure space between the lower casing 13 and the upper casing 11. In the meantime, the lower casing 13 includes a plurality of connecting portions 131 disposed on a surface of the lower casing 13, and each the connecting portion 131 is a stud.

The electric conduction element 15 is installed on the second side 113 and disposed in the enclosure space. In this preferred embodiment, the electric conduction element 15 is a circular metal plate sticker, but in other preferred embodiments, the electric conduction element 15 can be a carbon particle or any other equivalent device. In the same direction, the electric conduction element 15 has a width substantially equal to the width of the groove 117. In other words, the electric conduction element 15 comes with a size fitted exactly into the groove 117. However, persons ordinarily skilled in the art can understand that the width of the electric conduction element 15 can be smaller than the width of the groove 117, and the invention is not limited to the aforementioned embodiment only.

The circuit board 17 is installed between the electric conduction element 15 and the lower casing 13 and disposed in the enclosure space. In this preferred embodiment, in the same direction, the circuit board 17 has a width substantially equal to the width of the groove 117. In other words, the circuit board 17 comes with a size fitted exactly into the groove 117. However, persons ordinarily skilled in the art can understand that the width of the circuit board 17 can be smaller than the width of the groove 117, and the invention is not limited to the aforementioned embodiment.

Figure 2:
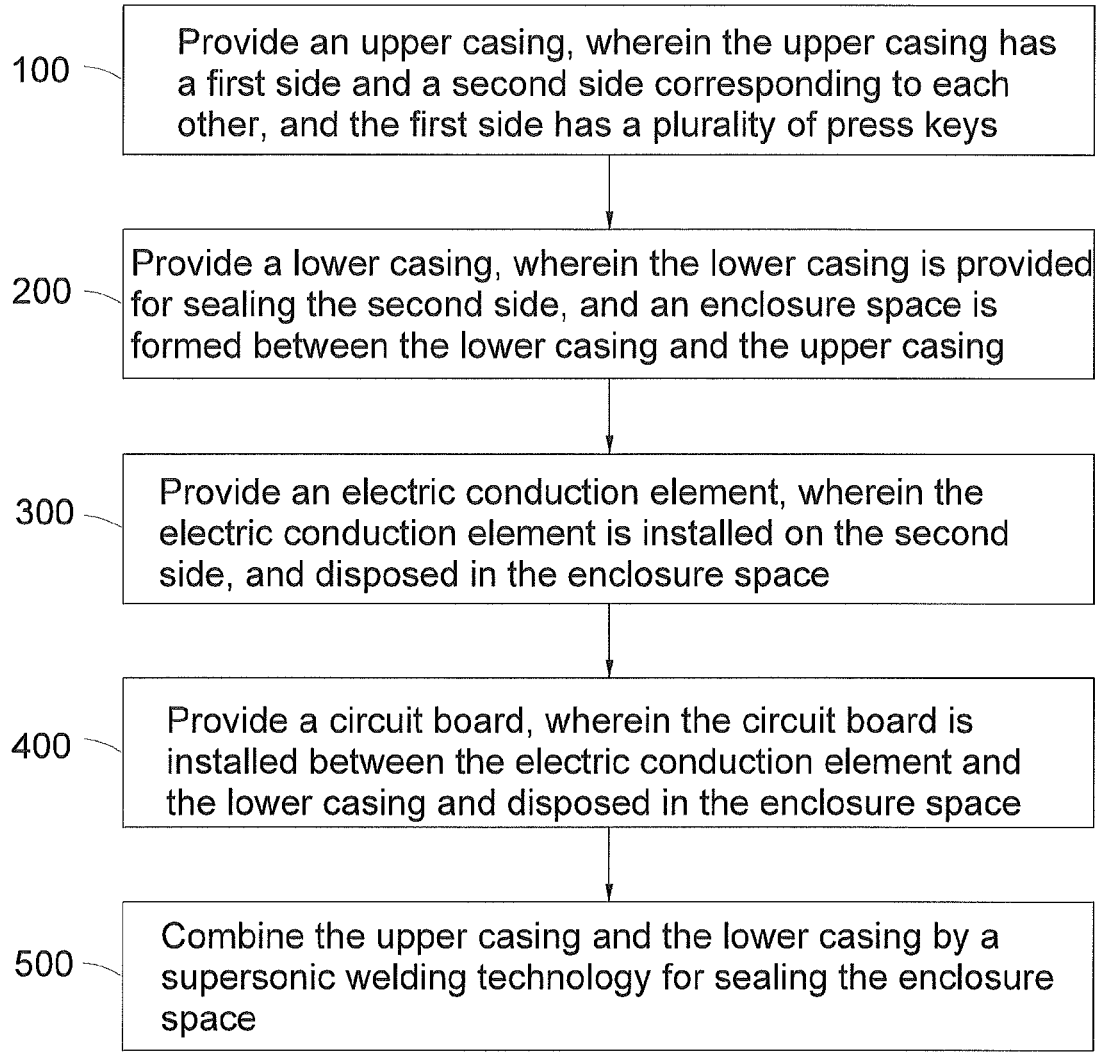
FIG. 2 is a flow chart of a modular keyboard manufacturing method in accordance with a first preferred embodiment of the present invention.

In FIG. 2, the manufacture of a modular keyboard 1 in accordance with this preferred embodiment comprises the following steps. In Step 100, an upper casing 11 is provided, wherein the upper casing 11 includes a first side 111 and a second side 113, and the first side 111 includes a plurality of press keys 115. In Step 200, a lower casing 13 is provided, wherein the lower casing 13 is provided for sealing the second side 113, and an enclosure space is formed between the lower casing 13 and the upper casing 11. In this preferred embodiment, the enclosure space is formed by the groove 117, and the lower casing 13 is a sheet cover. In Step 300, an electric conduction element 15 is provided, wherein the electric conduction element 15 is installed on the second side 113 and disposed in the enclosure space. In Step 400, a circuit board 17 is provided, wherein the circuit board 17 is installed between the electric conduction element 15 and the lower casing 13 and disposed in the enclosure space. In Step 500, the upper casing 11 and the lower casing 13 are combined by a supersonic welding technology for sealing the enclosure space. In this step, a welder such as a supersonic welder can be used, and at least one process such as a pressurization process, a cooling process, a hardening process or any other process is required. Since the aforementioned processes are prior art, and thus will not be described here.

The upper casing 11 and the lower casing 13 can be plastic casings such as thermoplastic plastic casings. By a supersonic welding technology, the high-frequency mechanical energy is used for softening or melting the thermoplastic plastic material at the joint of the upper casing 11 and the lower casing 13, and molecules at the joint will be fused by the supersonic vibrations so as to combine the upper casing 11 and the lower casing 13. It is noteworthy to point out that a specific pressure may be required for fixing the upper casing 11 and the lower casing 13 during the supersonic welding process, and the height of the enclosure space is preferably designed to be slightly greater than the sum of the thickness of the electric conduction element 15 and the thickness of the circuit board 17. In other words, the groove 117 has a depth slightly greater than the sum of the thickness of the electric conduction element 15 and the thickness of the circuit board 17 for preventing the electric conduction element 15 and the circuit board 17 from being pressed during the process of combining the upper and lower casings 11, 13. However, the height is not limited to this preferred embodiment only, but the enclosure space can have a height equal to the sum of the thickness of the electric conduction element 15 and the thickness of the circuit board 17 in other preferred embodiments.

The above-mentioned steps, steps 100 to 400, are provided for demonstrating the manufacturing method, components and structure of the invention only, but not intended for limiting the sequence of steps and installed components of the present invention. Thus, persons ordinarily skilled in the art can modify or adjust the sequence of the aforementioned steps of the procedure.

Figure 3A:
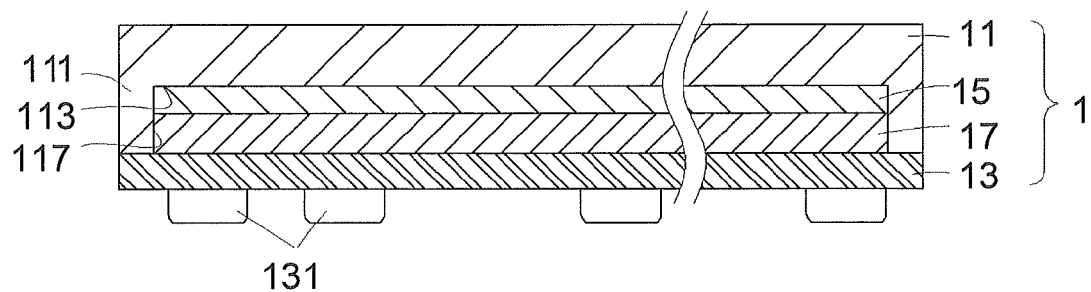
FIG. 3a is a cross-sectional view of an assembled modular keyboard in accordance with a first preferred embodiment of the present invention.
Figure 3B:
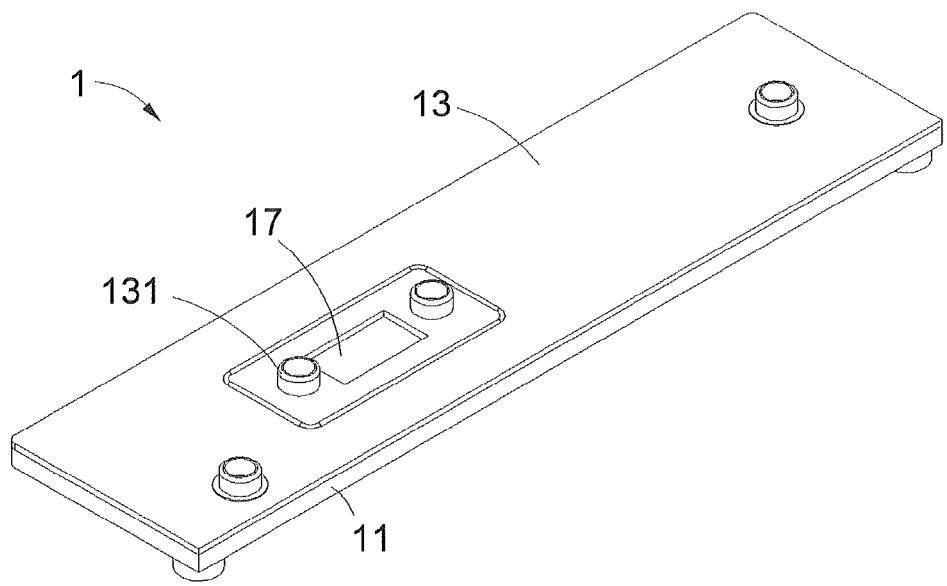
FIG. 3b is a top view of an assembled modular keyboard in accordance with a first preferred embodiment of the present invention.

In FIGS. 3a and 3b, the electric conduction element 15 and the circuit board 17 are installed between the upper casing 11 and the lower casing 13 and disposed in the enclosure space. Since the present invention manufactures the modular keyboard 1 by the supersonic welding method, supersonic waves are used for adhering the plastic product by a plastic welding method, such that the electric conduction element 15 and the circuit board 17 are covered and contained in the upper casing 11 and the lower casing 13, and then fused to form a module. In the assembling process of the production line, a connecting device such as a screw (not shown in the figure) is used for securing the connecting portion 131 to assemble the modular keyboard 1 into an electronic device, so as to reduce the manufacturing time and achieve the waterproof function.

Figure 4:
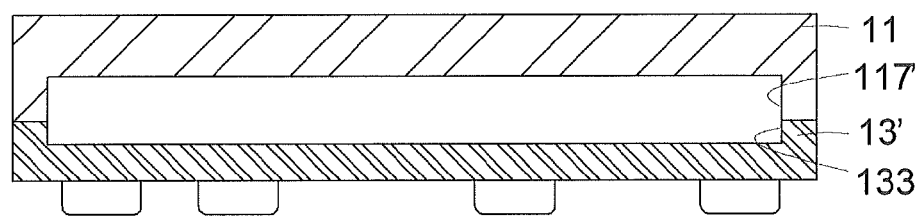
FIG. 4 is a cross-sectional view of a modular keyboard in accordance with a second preferred embodiment of the present invention.

With reference to FIG. 4 for a schematic view of a second preferred embodiment of the present invention, same numerals are used for same respective elements used for illustrating the aforementioned preferred embodiment.

Unlike the first preferred embodiment, both upper casing and lower casing of this preferred embodiment have corresponding grooves respectively.

In FIG. 4, the upper casing 11 includes a groove 117, and the lower casing 13' also includes a groove 133' opened outward and corresponding to the groove 117. In the manufacturing method of the present invention, the groove 117 and the groove 133' can be coupled, and both sides of the groove 117 and the groove 133' serve as welding portions for forming an enclosure space by the supersonic welding technology.

Of course, the structure of the upper casing 11 and the lower casing 13' (13) may be modified in other preferred embodiments. For example, the upper casing 11 and the lower casing 13' (13) are changed to corresponding recession and protrusion or any other equivalent structure, or only the lower casing 13' has the groove. As long as the electric conduction element 15 and the circuit board 17 are covered and contained by the upper casing 11 and the lower casing 13' (13), so that the upper casing 11 and the lower casing 13' (13) can be engaged with each other without any gap, so as to prevent water from entering into the keyboard, such arrangement can be used in the present invention.

In summation, the present invention welds the upper casing 11 and the lower casing 13' (13) integrally as a whole to achieve the waterproof effect and enhance the overall structural strength of the keyboard. In addition, the present invention simply requires a connecting device such as a screw to be assembled to an electronic product to achieve the effect of reducing the manufacturing.

While the invention has been described by means of specific embodiments, numerous modifications and variations could be made thereto by those skilled in the art without departing from the scope and spirit of the invention set forth in the claims.

What is claimed is:

1. A modular keyboard, comprising:
    an upper casing, having a first side and a second side disposed opposite to each other, and the first side having a plurality of press keys;
    a lower casing, for sealing the second side;
    an enclosure space, formed between the lower casing and the upper casing;
    an electric conduction element, installed on the second side, and disposed in the enclosure space; and
    a circuit board, installed between the electric conduction element and the lower casing, and disposed in the enclosure space;
    wherein the enclosure space has a height equal to a sum of a thickness of the electric conduction element and a thickness of the circuit board.

2. The modular keyboard of claim 1, wherein the upper casing is a plastic upper casing, and the lower casing is a plastic lower casing.

3. The modular keyboard of claim 1, wherein the electric conduction element is one selected from the collection of a circular metal plate sticker and a carbon particle.

4. A manufacturing method of a modular keyboard, comprising the steps of:
    providing an upper casing, wherein the upper casing has a first side and a second side corresponding to each other, and the first side has a plurality of press keys;
    providing a lower casing, wherein the lower casing is provided for sealing the second side, and an enclosure space is formed between the lower casing and the upper casing;
    providing an electric conduction element, wherein the electric conduction element is installed on the second side, and disposed in the enclosure space;
    providing a circuit board, wherein the circuit board is installed between the electric conduction element and the lower casing and disposed in the enclosure space; and
    combining the upper casing and the lower casing by a supersonic welding technology for sealing the enclosure space;
    wherein the enclosure space has a height equal to a sum of a thickness of the electric conduction element and a thickness of the circuit board.

5. The manufacturing method of claim 4, wherein the upper casing is a plastic upper casing, and the lower casing is a plastic lower casing.

6. The manufacturing method of claim 4, wherein the step of combining the upper casing and the lower casing by the supersonic welding technology further comprises at least one process selected from the collection of a pressurization process, a cooling process and a hardening process.

7. A modular keyboard comprising:
    an upper casing, having a first side and a second side disposed opposite to each other, wherein the first side has a plurality of press keys, and the upper casing includes a groove;
    a lower casing, for sealing the second side;
    an enclosure space, formed between the lower casing and the upper casing;
    an electric conduction element, installed on the second side, and disposed in the enclosure space; and
    a circuit board, installed between the electric conduction element and the lower casing, and disposed in the enclosure space, wherein the groove has a depth equal to a sum of a thickness of the electric conduction element and a thickness of the circuit board.

8. A modular keyboard comprising:
    an upper casing, having a first side and a second side disposed opposite to each other, wherein the first side includes a plurality of press keys;
    a lower casing, for sealing the second side, wherein the upper casing and the lower casing have corresponding grooves;
    an enclosure space, formed between the lower casing and the upper casing;
    an electric conduction element, installed on the second side, and disposed in the enclosure space; and
    a circuit board, installed between the electric conduction element and the lower casing, and disposed in the enclosure space, wherein the corresponding grooves have a total depth equal to a sum of a thickness of the electric conduction element and a thickness of the circuit board.

9. A manufacturing method of a modular keyboard, the method comprising:
   providing an upper casing, wherein the upper casing has a first side and a second side corresponding to each other, and the first side has a plurality of press keys, the upper casing includes a groove;
   providing a lower casing, wherein the lower casing is provided for sealing the second side, and an enclosure space is formed between the lower casing and the upper casing;
   providing an electric conduction element, wherein the electric conduction element is installed on the second side, and disposed in the enclosure space;
   providing a circuit board, wherein the circuit board is installed between the electric conduction element and the lower casing and disposed in the enclosure space, the groove has a depth equal to a sum of a thickness of the electric conduction element and a thickness of the circuit board; and
   combining the upper casing and the lower casing by a supersonic welding technology for sealing the enclosure space.

10. A manufacturing method of a modular keyboard, the method comprising:
   providing an upper casing, wherein the upper casing has a first side and a second side corresponding to each other, and the first side has a plurality of press keys;
   providing a lower casing, wherein the lower casing is provided for sealing the second side, and an enclosure space formed between the lower casing and the upper casing, the upper casing and the lower casing have corresponding grooves;
   providing an electric conduction element, wherein the electric conduction element is installed on the second side, and disposed in the enclosure space;
   providing a circuit board, wherein the circuit board is installed between the electric conduction element and the lower casing and disposed in the enclosure space, the corresponding grooves have a total depth equal to a sum of a thickness of the electric conduction element and a thickness of the circuit board; and
   combining the upper casing and the lower casing by a supersonic welding technology for sealing the enclosure space.

* * * * *